(12) United States Patent
Zimmermann et al.

(10) Patent No.: US 9,693,402 B2
(45) Date of Patent: Jun. 27, 2017

(54) MODULAR LED-LIGHTING SYSTEM

(75) Inventors: Michael Zimmermann, Heiligkreuz (CH); Eduardo Pereira, Siebnen (CH); Martin Hartmann, Dornbirn (AT)

(73) Assignees: Tridonic AG, Ennenda (CH); Tridonic GmbH & Co. KG, Dornbirn (AT)

( * ) Notice: Subject to any disclaimer, the term of this patent is extended or adjusted under 35 U.S.C. 154(b) by 935 days.

(21) Appl. No.: 13/635,230

(22) PCT Filed: Mar. 21, 2011

(86) PCT No.: PCT/EP2011/054184
§ 371 (c)(1),
(2), (4) Date: Nov. 27, 2012

(87) PCT Pub. No.: WO2011/113951
PCT Pub. Date: Sep. 22, 2011

(65) Prior Publication Data
US 2013/0193849 A1    Aug. 1, 2013

(30) Foreign Application Priority Data

Mar. 19, 2010 (DE) .................. 10 2010 003 060
Apr. 9, 2010 (DE) .................. 10 2010 014 594
Jul. 12, 2010 (DE) .................. 10 2010 031 244

(51) Int. Cl.
*H05B 33/08* (2006.01)

(52) U.S. Cl.
CPC ......... *H05B 33/08* (2013.01); *H05B 33/0815* (2013.01); *H05B 33/0827* (2013.01); *Y02B 20/347* (2013.01)

(58) Field of Classification Search
USPC .......... 315/70, 112, 113, 114, 115, 177, 192, 315/185 R, 246, 250, 254, 276, 282, 291,
(Continued)

(56) References Cited

U.S. PATENT DOCUMENTS 7,573,729 B2 * 8/2009 Elferich ............. H05B 33/0818
                                                        315/210
2005/0276053 A1 * 12/2005 Nortrup ................ F21S 48/325
                                                        362/294
(Continued)

FOREIGN PATENT DOCUMENTS

DE    10 2004 002018 A1    8/2005
DE    20 2008 012421 U1    3/2010
WO       2007147242 A1    12/2007

OTHER PUBLICATIONS

International Search Report issued in connection with the corresponding International Application No. PCT/EP2011/054184 on Nov. 24, 2011.

(Continued)

*Primary Examiner* — Douglas W Owens
*Assistant Examiner* — Jianzi Chen
(74) *Attorney, Agent, or Firm* — The H.T. Than Law Group

(57) ABSTRACT

The invention relates to a modular LED-light comprising a first module (1) to which an input voltage (9), preferably an AC-supply voltage, is guided, said first module comprising a second sub-module (B), preferably an insulating unit, a DC voltage separating the supply voltage by a galvanic separation being provided on the outlet of said insulating unit, and a control unit (G). Said LED light also comprises a second module (2), preferably a light management module, comprising an additional sub-module (C) which is fed by the DC-initial voltage of the first module (1), preferably a clocked constant flow source which is controlled by a control unit (E) of the second module (2), and an LED-module (F) which comprises at least one LED path (8) and which is supplied by the additional sub-module (C).

14 Claims, 4 Drawing Sheets

(58) Field of Classification Search
USPC .......................................................... 315/312
See application file for complete search history.

(56) References Cited

U.S. PATENT DOCUMENTS

| | | | |
|---|---|---|---|
| 2008/0084167 A1* | 4/2008 | Waffenschmidt | H02M 3/337 315/210 |
| 2008/0315783 A1* | 12/2008 | Inaba | H05B 33/0815 315/247 |
| 2009/0195159 A1* | 8/2009 | Smith | F21V 25/04 315/33 |
| 2010/0026187 A1 | 2/2010 | Kelly et al. | |
| 2010/0052554 A1* | 3/2010 | Zanforlin | H05B 33/0815 315/210 |
| 2010/0084985 A1* | 4/2010 | Woytowitz | H05B 33/0842 315/210 |

OTHER PUBLICATIONS

English translation of the International Preliminary Report on Patentability issued in connection with the corresponding International Application No. PCT/EP2011/054184 on Oct. 4, 2012.

* cited by examiner

US 9,693,402 B2

MODULAR LED-LIGHTING SYSTEM

BACKGROUND OF THE INVENTION

The present invention relates quite generally to the operation of LEDs, these being understood to be both inorganic LEDs and organic LEDs (OLEDs).

In principle, it is already known to supply an LED path, which can have one or more series-connected LEDs, with electrical power starting from a constant-current source. It is also known to use a PWM modulation for carrying out dimming so that in the turn-on periods of a PWM pulse train, the said constant current control is carried out. During the dimming, the duty ratio of the PWM signal is thus changed then.

To provide the supply voltage of the constant-current source, it is possible to use, for example, an actively clocked PFC (Power Factor Correction) circuit.

Finally, other requirements must also be considered when operating LEDs, for example, that DC isolation is usually demanded between the LED path and the supply voltage of the PFC, typically an alternating line voltage.

SUMMARY OF THE INVENTION

The result of the above is that for operating an LED path properly and advantageously, several circuit blocks must be functionally present (rectifiers, PFC, DC isolation, constant-current source etc.). This may lead to relatively complex circuits.

The invention provides a number of approaches of how an LED path can be operated in a particularly advantageous manner.

This object is achieved by the features of the independent claims. The dependent claims develop the central concept of the invention in a particularly advantageous manner.

A first aspect of the invention provides a modular LED lighting having a first module to which an input voltage, preferably an AC supply voltage, can be supplied and which has:

a second submodule, preferably an isolating unit, at the output of which a DC voltage electrically isolated from the supply voltage is provided, and a control unit, furthermore having a second module, preferably a lamp management module which has a further submodule, supplied with the DC output voltage of the first module, preferably a clocked constant-current source which is controlled by a control unit of the second module, and—an LED module which has at least one LED path and which is supplied by the further submodule.

The control unit of the first module and the control unit of the second module can communicate via a communication interface.

The internal data communication between the first module and the second module can take place in standardized manner, i.e. independently of an external bus communication of the first module.

The first module can provide, apart from the DC supply voltage for the further submodule, also a DC low-voltage supply for the second module.

The second module and the LED module can be accommodated in a common housing.

An active and/or passive cooling means can be connected to the common housing.

The control unit of the first module can be addressable by an interface circuit via an external bus preferably with potential isolation.

The second module can be an insulated energy-transferring DC/DC converter.

Several second modules can be supplied with DC voltage by the first module.

The first module can supply one or more connected second modules in parallel with at least two DC voltages having a different level.

BRIEF DESCRIPTION OF THE DRAWINGS

Further advantages, features and characteristics of the invention will be found in the subsequent description of preferred exemplary embodiments and with reference to the attached figures.

DETAILED DESCRIPTION OF THE INVENTION

General Structure of the Modular Circuit Concept:

The general structure of the modular circuit concept according to the invention for an LED-based lighting, for example for a so-called downlight (spotlight inserted into the ceiling) will now be explained. Both inorganic LEDs and/or organic LEDs (OLEDs) can be used.

Figure 1:
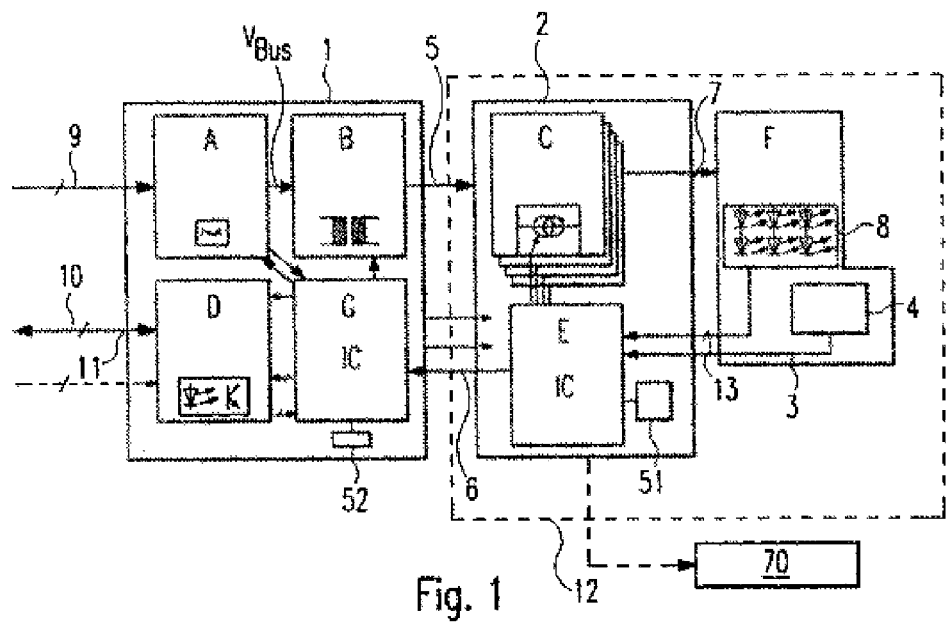
FIG. 1 shows the modular structure of a modular LED lighting system according to the invention.

As can be seen in FIG. 1, the modular circuit concept according to the invention has a first module 1 which is supplied preferably with the input voltage 9, especially alternating line voltage. This input voltage 9 is supplied to a first submodule A which typically rectifies the alternating voltage supplied as input voltage 9, the rectified alternating voltage then being supplied to an actively clocked PFC (Power Factor Correction) circuit of the submodule A, if present. The output voltage of the first submodule A is a DC voltage, called "bus voltage $V_{Bus}$" in the text which follows, which is supplied to a second submodule B of the first module 1. The second submodule B essentially has the function of electrical isolation and can have for this purpose, for example, a transformer as electrical isolating element. In addition, the second submodule B is used for providing a stabilized direct voltage, the DC supply voltage 5.

By means of the submodule G, a control unit of the module 1 is designated which, in particular, can be implemented as integrated circuit such as, for example, ASIC or microprocessor or hybrid thereof. As shown diagrammatically in FIG. 1, this control unit G drives active switching elements of the second submodule B which can be designed, for example, in the form of a half bridge (for example of a half bridge driver and two switches in series, see FIG. 2 in the text which follows), which generates an alternating voltage supplied to the transformer 19 of the second submodule B. The control unit G can have programming inputs by means of which programming or calibration programming of the control unit G is possible. For this purpose, the terminals of the control unit G can be brought out onto the circuit board of the second submodule B in order to enable this submodule B, and thus the control unit G, also to be programmed after delivery of the submodule B.

By means of the second submodule B of the first module 1, an electrical decoupling is designated by which the control unit G of module 1 communicates with the submodule D as interface circuit. This interface circuit D can have a data interface 11 which, in particular, can be designed for linking an external analogue or digital bus 10, for example according to the DALI industry standard. As an alternative or additionally, however, unidirectional or bidirectional signals can also be transmitted at this data interface 11 or interface circuit D according to other standards. Furthermore, signals which, starting from a pushbutton or switch, to be operated manually, supplied through the data interface 11 or interface circuit D itself or externally (for example also via the input voltage 9), can be received alternatively or additionally at this data interface 11 or interface circuit D.

The essential functions of the first module 1 are thus the provision (at the output of the second submodule B) of a DC voltage (by rectifying the output voltage of the transformer 19 of the second submodule B using rectifier 22) starting with a supplied input voltage 9, and the external communication via the data interface 11 or interface circuit D.

A second module 2 is provided as circuit module, preferably spatially separate from the first module 1 mentioned. This second module 2 essentially has the function of the so-called lamp management, which means that this second module 2, on the one hand, supplies the connected lighting means (in this case the LED path 8 comprising one or more LEDs) with constant current and, on the other hand, receives feedback values (diagrammatically designated by 13) from the area of the LED path 8.

The DC supply voltage 5 at the output of the second submodule B of the first module 1 is thus supplied to a further submodule C as controllable constant-current source. This further submodule C thus supplies the LED path with constant current via an output 7. The second module 2 can here contain several converter stages (several further submodules C as constant-current sources), wherein these converter stages (further submodules C as constant-current sources) can in each case drive mutually separate (independent) LED paths 8.

The further submodule C can be designed both as clocked constant-current source (that is to say, for example, as buck converter or flyback converter) or as linear controller (implemented using transistors or integrated circuits). An example of a drive arrangement by means of linear controller is shown diagrammatically in FIG. 6a.

Furthermore, the second module 2 has its own control unit E which, in turn, can be constructed as microcontroller, ASIC or as a hybrid of these. This control unit E of the second module 2 thus contains feedback values 13 from the area of the LED path 8. The control unit E drives the one or several further submodules C in the second module 2. In this arrangement, the current is controlled by the LED path 8, but other feedback values can also be detected and monitored, such as, for example, the LED voltage or the temperature, for correctly operating the LEDs and for error detection.

In a preferred embodiment, the further submodule C is designed as clocked constant-current source, this submodule C having at least one actively clocked switch SW1 as part of the clocked constant-current source. An example of a drive by means of clocked constant-current source is shown diagrammatically in FIG. 6b. In this diagrammatic representation, no detections of feedback values such as, for example, of the LED current, the LED voltage or of the current through the switch SW1 are shown for reasons of clarity. In this example, the LEDs of the LED paths 8, 8', 8" (which are arranged, for example, on an LED module F) are fed by in each case one buck converter as clocked constant-current source via the outputs 7, 7', 7".

The actively clocked switch of the clocked constant-current source is driven in this arrangement directly or indirectly (for example via a driver chip) by the control unit E. In contrast to a linear controller, the use of a clocked constant-current source enables different LED modules F to be operated flexibly. The clocked constant-current source can adjust and adapt both the voltage and the current through the LED module F. The clocked constant-current source represents an actively clocked DC/DC converter which receives the DC supply voltage 5 and feeds the LED module F correspondingly with the desired LED current and/or LED voltage, preferably by being driven by the control unit E on the basis of the feedback values supplied to this control unit E.

The clocked constant-current source also offers the advantage that the operating mode of the submodule C can be matched to the respective current operating mode. Thus, the type of clocking of the clocked constant-current source can be adapted, for example, the switch SW1 can be driven with a frequency-modulated, pulse-width-modulated or a combination of frequency-modulated and pulse-width-modulated signal. The current operating mode can differ, for example, for an operation with high brightness of the LED path 8 or with low brightness.

Figure 6A:
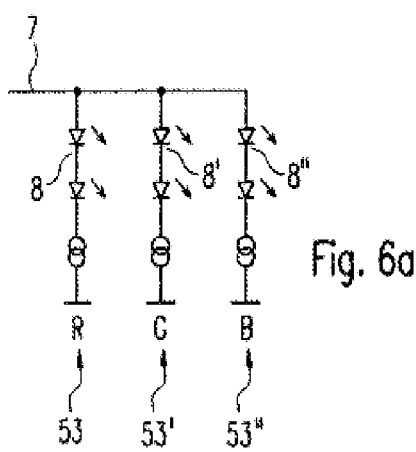
FIGS. 6a and 6b show the LED module comprising a number of mutually independent controllable channels.
Figure 6B:
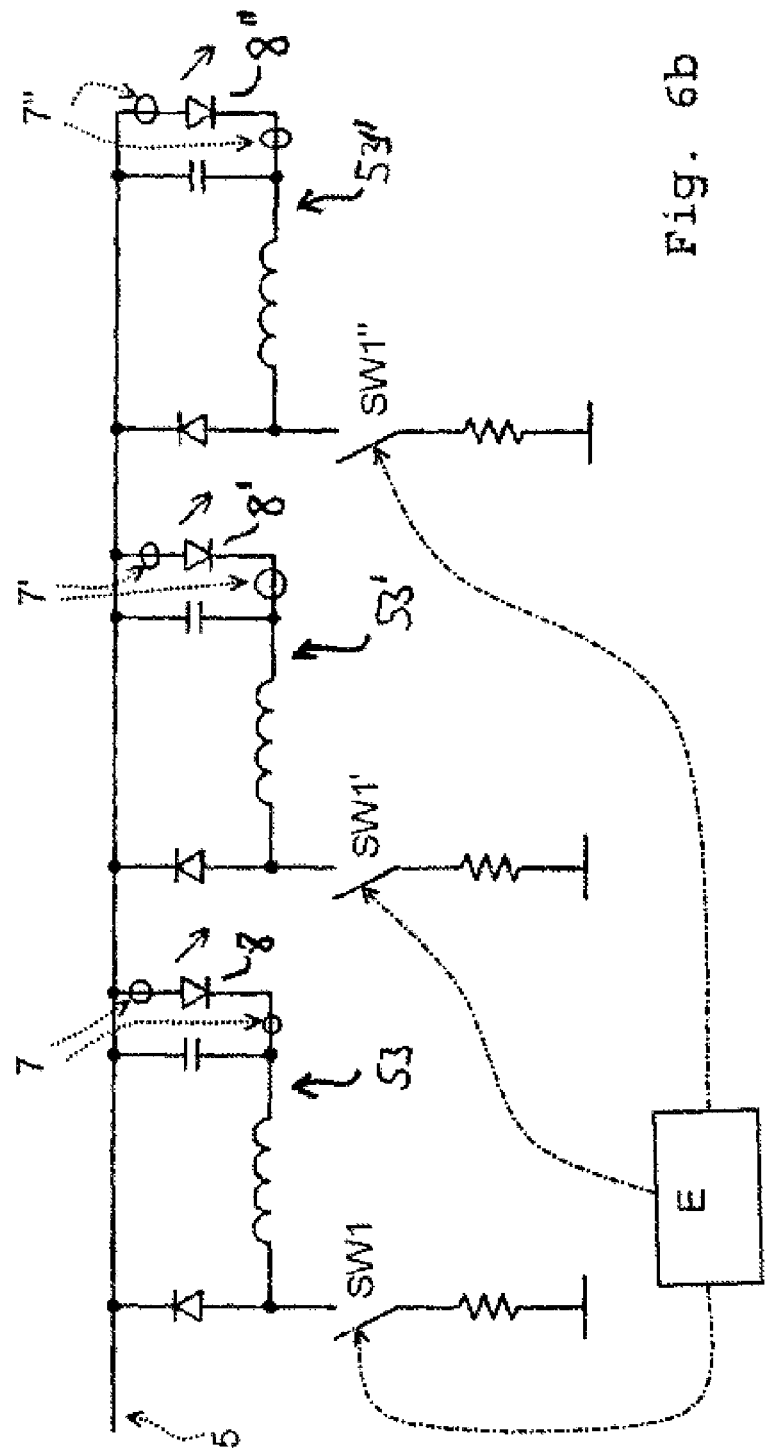

As shown in the example of FIG. 6b, it is possible that a number of clocked constant-current sources are present for feeding the LED paths 8, 8', 8" via outputs 7, 7', 7". The switches SW1, SW1', SW1" of the individual clocked constant-current sources can be driven preferably independently of one another by the control unit E. This enables the individually required LED currents and LED voltages to be supplied via outputs 7, 7', 7" in each case for each LED path 8, 8', 8". In this arrangement, it is also possible that in each case a separate control unit E, E', E" is present for each of the clocked constant-current sources with the switches SW1, SW1', SW1".

As already mentioned, the control unit E can detect different feedback values (such as, for example, the LED voltage, the LED current or the temperature) for correctly operating the LEDs and for error detection, and, preferably on detection of an error, switch the clocked constant-current source into an error mode of operation. This can be done, for example, by changing into a burst mode or an operation with low turn-on time of the switch SW1.

In addition, the control unit E can be in data communication unidirectionally or bidirectionally via a communication interface 6, which is arranged additionally to the DC supply voltage 5, with the control unit G of the first module 1. The communication interface 6 can also be used for transmitting the low-voltage supply (there is then both data communication and energy transmission). The communication interface 6 can also be integrated in the DC supply voltage 5, for example, the polarity of the DC supply voltage 5 can be switched over or a carrier signal can be modulated onto the DC supply voltage 5.

Via the communication interface 6, the control unit E can also convey an error message and preferably also information about the type of error to the control unit G of the first module 1 by means of the bidirectional data communication for example in the case of an error detection.

As is shown diagrammatically in FIG. 1, the second module 2, in this case as lamp management module, is accommodated preferably in a common housing 12 with the actual LED module F.

As is shown diagrammatically in FIG. 1, the LED module F can have its own memory 4, for example in the form of an EPROM. The reference symbol 3 shows diagrammatically that the control unit E of the second module 2 can access this memory 4 of the LED module F.

With regard to the first module 1, it should be pointed out that the PFC circuit is only optional.

In addition, it should be pointed out that the functions of submodules A, B and C as shown can also be integrated with regard to circuitry so that, as long as these functions are present in principle, they do not need to be reflected in a corresponding structure of the circuit topology.

It is the advantage of the modular structure according to FIG. 1, for example, that the first module 1 or the second module 2 can be produced by different manufacturers. In addition, several second modules 2 can also be connected to a first module 1 in the sense of a master/slave operation. When using clocked constant-current sources as submodule C, this creates a two-stage system with modular structure wherein several second modules 2 can be connected to a first module 1 and an operation of different LED modules F and/or a different operation of identical LED modules F is made possible in dependence on the data communication taking place via the communication interface 6.

Finally, the modular structure also allows the corresponding submodules and especially the second module 2 to be exchangeable, retaining the remaining components.

When the second module 2 is accommodated in a common housing 12 with the actual LED module F, the advantage arises that this combination of second module 2 and LED module F can be adjusted in itself so that, for example, their radiation characteristic, quantity of light, color of light and/or direction of light can be parameterized and thus calibrated. The first module 1 and also the user can thus have one or more calibrated systems which, however, can then be driven identically and also behave correspondingly. This internal calibration of the combination of second module 2 and LED module F can take place, for example, via one of the following methods:
  calibration in production or during activation
  a closed control system within this combination (for example by means of an internal sensor system)
  interpolation points
  methods with LED characterization
  or a combination of the methods mentioned.

The communication between the first module 1 and the second module 2 via the communication interface 6 takes place correspondingly preferably in standardized manner.

As shown, instructions or enquiries received from outside, for example via a bus line of the external bus 10 via the data interface 11, are supplied only to the first module 1. This can thus be called external data communication, in contrast to the internal data communication via the communication interface 6 between the first module 1 and the second module 2.

This has the advantage that, for matching to different external buses 10, only the first module 1 has to be matched whereas the structure and the data protocol for the second module 2 remain unaffected by this.

The communication via the internal communication interface 6 is thus also standardized since it is independent of different bus protocols or control signals which can be applied to the first module 1.

Communication via the internal communication interface 6 combined with the modular structure of the system results in the advantage that the operating data for the optimum feeding of the second module 2 can be transmitted from the second module 2. The second module 2 (preferably starting with control unit E) can convey the required operating data to the first module 1 via the internal communication interface 6. This provides the advantage that a first module 1 can be combined with many different second modules 2, wherein the required operating data can then be read out of the second module 2.

Examples of the feedback values 13 from the LED path 8 are the LED current measured directly or indirectly and/or the voltage over the LED path 8.

In the memory 4 which is associated with the LED module F, operating data for the LEDs of the LED path 8 can be stored, for example at the manufacturer. These data in this memory 4 can thus be, for example, characteristic values, the permissible maximum values for current and/or voltage, temperature dependence of electrical or optical (spectra) parameters of the LEDs, etc. These operating data for the LEDs (for example data from memory 4), too, can be conveyed to the first module 1 via the internal communication interface 6.

As already stated briefly above, a first module 1 can supply several second modules 2 in the sense of a master. This means that a single first module 1 supplies several second modules 2 not only with a DC supply voltage 5 but also communicates with these bidirectionally in the sense of an internal communication interface 6.

As already explained briefly above, the control unit G in the first module 1 can drive the second submodule B preferably constructed to be clocked. The same control unit G or preferably also a further control unit (not shown) can also control the operation of the PFC of the first submodule A, i.e., for example, drive the switch of the PFC of submodule A and accept for signals from the area of the PFC such as, for example, the input voltage, the current through an inductance of the PFC, the current through the switch of the PFC, the output voltage of the PFC, as is shown diagrammatically by arrows in FIG. 1.

The PFC can be, for example, a boost converter, buck-boost converter, an insulated flyback converter or also a SEPIC converter.

In this arrangement, the output voltage (bus voltage) $V_{Bus}$ of the PFC of the first submodule A is typically within a range of several hundred volts DC. Due to transformer 19 in the second submodule B, this DC voltage can thus be lowered, for example to a voltage within a range of from 20 to 60 volts, preferably 40 to 50 volts DC. After the output of the first module 1, the DC supply voltage 5 is thus at a lower level than the voltages prevailing internally in the first module 1 which makes lower demands on the requirements, for example on the insulation of the DC supply voltage 5 of the second module 2 and on the second module 2 itself. In addition, a second output voltage, for example a low DC voltage supply for the second module 2, can optionally be generated in the first module 1 and provided for the second module 2.

One advantage of the modular structure with internal communication interface 6 as described above is that the second module 2 (or, in the case of the existence of several second modules 2 at least individual ones of these) can be turned off whilst the first module 1 can still be addressed for the communication interface 6 or possibly can also send out messages via the communication interface 6. The first module 1 can thus carry out emergency light detection (switching from AC to DC supply or rectified AC supply). In addition, the control unit G, for example as a microcontroller, of the first module 1 can be supplied with power only via the external bus 10 in this idle state, when the idle state of the external bus 10 is not equal to 0 volts (such as, for example, in DALI). Thus, an energy transmitted via the external bus 10 can be used for supplying the control circuit G (especially as start-up energy for the control circuit G or a low-voltage supply circuit). The actual voltage supply of the first module 1 can thus be turned off in this idle state. It is also possible that only one wake-up signal is sent via the external bus 10 which provides a start-up energy as power for the short-term supply for the control circuit G or a low-voltage supply circuit. In this case, the first module 1 can also be placed completely into an idle state without energy consumption. The wake-up signal can also be a data transmission or a short-term addition of a voltage.

If several second modules 2 are supplied by a first module 1 (central module), selectively selected ones of these several second modules 2 can, naturally, be switched off. This, too, leads to saving electrical losses. For example, in the case of emergency lighting, it can be provided that, in order to achieve the lower basic brightness for emergency lighting operation, only one or a subgroup of the several second modules 2 supplied by the first module 1 is operated.

The common housing 12 is connected to a passive or preferably active cooling means 40, especially driven by the control unit E, for example a fan or a cooling unit.

In addition to the communication interface 6, the second module 2 (lamp management module) can also have an additional interface (not shown). This additional interface can be designed to be, for example, wire-connected or also wireless. Via this interface, data can be read out of the second module 2, for example, especially for maintenance purposes such as, for example, the exchange of a second module 2. However, it is also possible to update the data or control software via this additional interface, especially in the case of wireless communication. It can also be possible, especially to read data out of this second module 2 via this additional interface also in the case of lacking DC supply voltage 5 (power transmission) for the second module 2. The additional interface is arranged preferably spatially separate from the communication interface 6 on the second module 2.

Adaptive Drive for the Clocked DC-DC Converter (Second Submodule B) as Energy-Transmitting Converter As already explained above, the first module 1 has a second submodule B which has the function of an insulating converter. This second submodule B is supplied with a DC voltage (bus voltage) $V_{Bus}$, for example, starting with the PFC of the first submodule A.

As explained in detail in the text which follows, this second submodule B has a clocked insulating DC/DC converter. The latter will now be explained with reference to FIG. 2.

Figure 2:
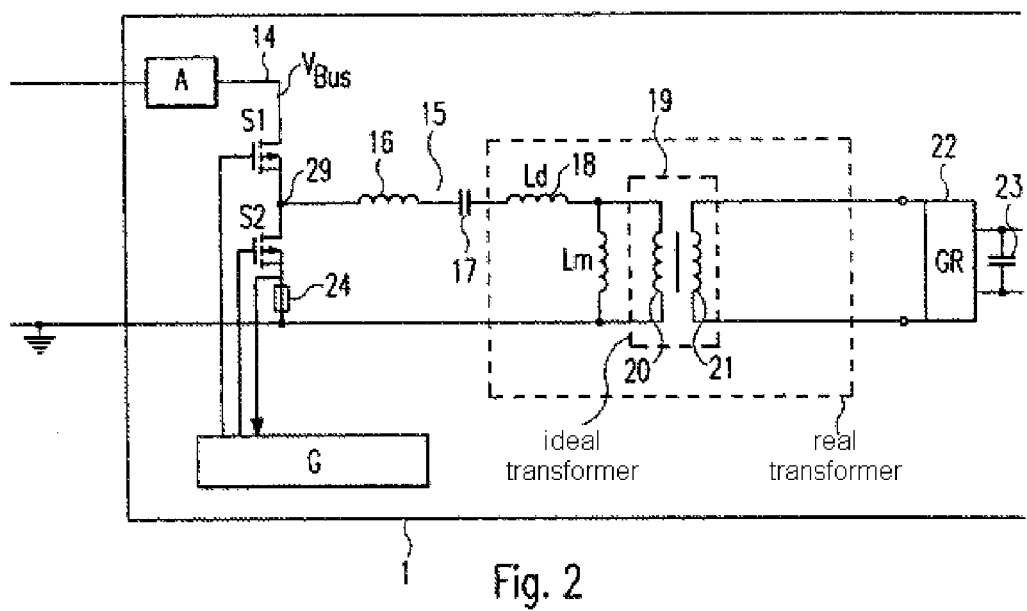
FIG. 2 shows an exemplary embodiment of an insulated DC/DC converter in the form of an inverter with following resonant circuit and transformer.

FIG. 2 shows that the output voltage of module A (for example PFC), namely the bus voltage $V_{Bus}$, is supplied to an inverter 14 which, for example, can be designed as half-bridge inverter with two switches S1, S2. The drive signals for clocking the switches S1, S2 can be generated by the control unit G of the first module 1.

The center 29 of the inverter 14 is joined in the example shown by a resonant circuit 15, constructed here as series-resonant circuit, namely an LLC resonant circuit. In the example shown, this resonant circuit 15 has a first inductance 16, a coupling capacitor 17, a transformer 19. The resonant circuit 15 is followed by a transformer 19 with a primary winding 20 and a secondary winding 21. The inductance 16 can be integrated in the transformer 19 as will still be explained later.

With regard to the example shown, it should be noted that the transformer 19 is shown as an equivalent circuit. In this context, the primary winding 20 has in reality an inductance 18 as integrated stray inductance and additionally a main inductance Lm which carries the magnetizing current.

The transformer 19 is followed by a rectifier 22 at the output of which the stepped-down DC supply voltage 5 is then provided for the lamp management module 2. Thus, the transformer 19 provides for the necessary electrical decoupling (insulation with respect to the input voltage 9 supplied to the first module 1). As known per se, the rectifier 22 can be designed with two or four diodes but, instead, a so-called synchronous rectifier can also be provided which has two MOSFETs. As known per se, this synchronous rectifier carries out a full-bridge rectification with the two MOSFETs. Thus, the rectifier 22 can be constructed both as active rectifier (with actively switched elements such as, for example, MOSFETs) or as passive rectifier (with passively switched elements such as diodes). It is possible to perform full-wave rectification or also only half-wave rectification. As shown, the rectifier is followed by a storage capacitor 23. At the output, other filter elements such as, for example, one or more inductances and/or also additional capacitors can also be present for smoothing and stabilizing the output voltage (DC supply voltage 5).

With regard to the resonant circuit 15 constructed as LLC resonant circuit in the example shown, it should be noted that the inductance 16 does not need to be present as a separate component. Instead, this function can be handled by the leakage of the primary winding 20 of a real transformer. If thus the first inductance 16 is to be formed by the leakage of the primary winding 20 of the transformer 19, selective attention is paid to the fact that there is no perfect coupling between primary winding 20 and secondary winding 21 of the transformer 19. The necessary leakage effect which functionally allows the first inductance 16 to be achieved can be achieved selectively for example by correspondingly spacing the primary winding 20 and the secondary winding 21 of the transformer 19. If this leakage effect should not be sufficient, an inductance 16 actually also present as separate component will be provided.

The combination of the inverter 14 with the resonant circuit 15 and the following rectifier 22 thus forms a DC/DC converter, insulating by means of transformer 19, as energy-transferring converter. In this arrangement, this DC/DC converter is fed by a stabilized direct voltage, the bus voltage $V_{Bus}$ and from this, a DC supply voltage 5 is generated at the output of the DC/DC converter which voltage also represents a stabilized direct voltage, this being insulated by the transformer 19 with respect to the bus voltage $V_{Bus}$ and preferably having a different potential.

On the other hand, this principle is also applied to other resonant circuits such as, for example, parallel resonant circuits or combinations of series and parallel resonant circuits.

One advantage of using a resonant circuit in such an energy-transferring DC/DC converter lies in the utilization of a resonance step-up in order to provide for low-loss switching of the switches S1, S2 of the inverter 14, if possible, on the secondary side in the case of nominal low or high loading. For this purpose, the system usually works in the vicinity of the resonant frequency of the resonant circuit or in the vicinity of a harmonic of a resonance of the output circuit.

The output voltage (at the storage capacitor 23) of the transmitting converter is thus a function of the driving frequency for switches S1, S2 of the inverter 14, in this case designed as half-bridge inverter by way of example.

If, instead, a low load is present at the output of the circuit shown in FIG. 2 (that is to say module 2 and the LED modules F in FIG. 1 represent a low electrical load), the driving frequency of switches S1, S2 of the inverter 14 is increased away from the resonant frequency.

As the driving frequency is changed, the phase angle between the voltage and the AC current at the center 29 of the inverter 14 now also changes, instead.

With a very high load (for example large current through the LEDs) and thus an operation close to resonance, the phase angle between current and voltage at the center 29 is very small. As mentioned, at low load and thus an operation further distant from resonance when thus, for example, a low power flows through the LED path 8 and thus no or only a low power is taken from the secondary side of the transformer 19, the phase angle becomes very large (see FIG. 3c) and can be, for example, up to 50°. In this state, currents thus continue to flow through the inverter 14 which lead to electrical losses without any noteworthy power flowing into the LED path 8.

It is possible to provide combined control. The combined control consists in that two control variables are used for the variable 'output voltage of the energy-transferring insulated converter' to be controlled, namely, apart from the clocking of the at least one switch S1, S2 of the inverter 14, the change in bus voltage $V_{Bus}$ of the inverter 14. The change in bus voltage $V_{Bus}$ can be achieved, for example, by correspondingly driving the PFC of the first submodule A.

In addition or alternatively, it is possible to adapt not only the bus voltage $V_{Bus}$ by correspondingly driving the PFC of the first submodule A. Depending on the load state or also operating state, the PFC of the first submodule A can change the operating mode either independently or by means of a corresponding drive, especially by means of the control unit G. In particular, the PFC of the first submodule A can operate either in the so-called borderline mode between discontinuous and continuous conduction mode during an operation at high load and operate in discontinuous conduction mode during operation at low load or in stand-by mode. However, it would also be possible, for example, that the PFC of the first submodule A changes into so-called burst mode (that is to say a pulse/pause operating mode, or also called pulse mode) during operation of a low load or in stand-by mode. In this process, the supply voltage (bus voltage $V_{Bus}$) is still kept equal but after a number of drive pulses for the switch or switches of the PFC, a relatively long pause is inserted before the next burst (pulse) is applied as drive signal for the switches of the PFC. The pause between the pulse trains is then much longer, that is to say, for example, at least twice an addition of the turn-on periods of the switches of the PFC.

There is thus a combined control concept in which the said control variables are combined in dependence on the load pick-up from a feedback signal which reproduces this load pick-up directly or indirectly.

Another possibility is to extend in the control variable "frequency of switches", the frequency remaining the same, the dead time (see FIG. 3b) between the turn-on periods of the switches S1, S2 of the inverter 14. Thus, for example, the increase in frequency of the power provision can be increased to a maximum permissible driving frequency of the switches S1, S2 of the inverter. At this maximum permissible frequency (corresponding to the maximum permissible phase angle), the second control variable is then used for further reducing the power consumption, namely the extension of the dead time between the turn-on periods of the switches S1, S2.

A further possibility is to change, the frequency remaining the same, the ratio of turn-on period to turn-off period of the switches S1, S2 of the inverter 14 (that is to say the pulse control factor). The pulse control factor is preferably reduced with decreasing load. Thus, for example, the reduction in frequency of the power provision can be increased to a maximum permissible driving frequency of the switches S1, S2 of the inverter 14. At this maximum permissible frequency (corresponding to the maximum permissible phase angle), the second control variable is then used for reducing the power consumption further, namely the change in turn-on period of the switches S1, S2 (with the frequency remaining the same).

Figure 3:
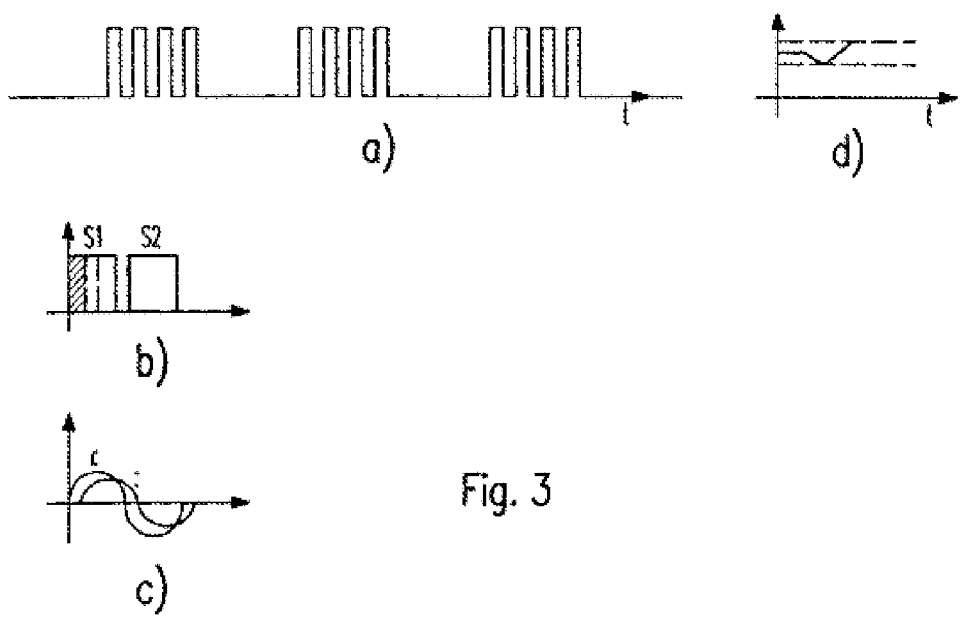
FIGS. 3a-3d show diagrammatically other control modes for the DC/DC converter from FIG. 2.

A further possibility of introducing a further control variable is the introduction of a so-called burst mode (that is to say a pulse/pause operating mode, or also called pulse mode), see FIG. 3a. In this mode, the supply voltage (bus voltage $V_{Bus}$) is still kept the same, but the frequency is not increased further for reducing the load provision at least when the driving frequency will reach a maximum permissible value. Instead, a relatively long pause is inserted after a number of drive pulses for both switches S1, S2 (the number being greater than 1) before the next burst (pulse) is applied as drive signal for the switches S1, S2. The pause between the pulse trains is then much longer, that is to say, for example, at least twice an addition of the turn-on periods of switches S1, S2.

In this burst mode, in which the control variable thus is the length of dead time between two pulse trains, there will naturally be a certain ripple of the voltage at the output end, that is to say at the storage capacitor 23 as shown in FIG. 3d. According to the invention, it can then be provided that a permissible ripple corridor is provided around a nominal value for the voltage at the storage capacitor 23. When the voltage has reached the upper limit value of the ripple corridor after a certain number of pulses of a pulse train (burst), a relatively long interpulse period is inserted. In this interpulse period of the burst mode, the voltage across the storage capacitor 23 then drops until it reaches the lower limit value of the predetermined ripple corridor. On reaching the lower limit value, the next pulse train is applied so that this rise and fall of the voltage (ripple) across the storage capacitor 23 will be repeated cyclically. This is thus a hysteretic control. The burst packets (that is to say the period in which clocking takes place for short periods) can be kept relatively short in this arrangement. In this manner, it is possible to counteract disturbances and also audible noises. As an alternative, the bursts can also be generated with a variable repetition rate and/or duration of the packets. If the submodule C is designed as clocked constant-current source, the ripple of the DC supply voltage 5, occurring in the burst mode, can be compensated for by correspondingly driving the clocked constant-current source. This can be done, for example, by means of a control loop for directing the LED current or by operating the clocked constant-current source in dependence on the amplitude of the DC supply voltage 5.

As already mentioned, the adaptive adjustment of the operating mode (control variable) of the DC/DC converter is carried out in dependence on the load on the secondary side, i.e. the load which is supplied by the voltage across the storage capacitor 23. For this purpose, a signal reproducing the load can be fed back to the drive circuit (IC in the control circuit G in FIG. 1), or an externally supplied dimming signal. In this context, the power consumption of the load can be measured on the secondary side (with respect to transformer 19) but also on the primary side of transformer 19. For example, the voltage drop across a measuring resistor 24 in series with switches S1, S2 or at least in series with one of switches S1, S2 of the inverter 14 can be used as a signal reproducing the power consumption of the load. The actual power consumption is then represented essentially by a product of the supply voltage (bus voltage $V_{Bus}$) (measured or at least kept constant by the PFC) by this current, measured via the voltage drop across the measuring resistor 24, through the inverter 14.

The above example gave an acquisition on the primary side for a signal reproducing the power consumption of the load. Naturally, feedback signals on the secondary side can also be used instead, for example the current through the and/or the voltage across the LED path 8, etc. as feedback signal which reproduces the power consumption of the load.

A preferred sequence of the adaptive combined control is in this context to perform the reduction for the load by increasing the driving frequency of the switches S1, S2 of the inverter 14 continuously until a permanently predetermined maximum frequency is reached. When this maximum frequency is reached, but the supplied power for the load should still be reduced, the drive circuit will then adaptively select one of the further operating modes listed above. If, for example, the bus voltage $V_{Bus}$ is lowered when the permissible maximum frequency is reached, the permissible maximum frequency of the drive for the switches S1, S2 can then be retained, or if this can be overcompensated by lowering the bus voltage $V_{Bus}$ or the other selected control variable, the driving frequency even lowered again to a lower range of nominal values.

Thus follows a switching of the control variable for the power supply for the secondary side when the maximum frequency is reached. As examples of a further control variable which is then used additionally or alternatively to the change in driving frequency, the change (lowering) of the supply voltage (bus voltage $V_{Bus}$), the change of the dead time between the turn-on periods of the two switches S1, S2 or the change in the dead time between two pulse trains in burst mode have already been mentioned. In this context, a combination of further control variables can also be utilized, for example, both the pulse control factor and the dead time can be changed.

In principle, an alternative drive for a clocked DC/DC converter as submodule B is thus available, wherein the adaptivity refers to the adaptation of the control variables in dependence on the load consumption of the secondary side of the DC/DC converter. The submodule B can also be formed by an inverter having a switch, for example as Class-E converter or quasi-resonant flyback converter wherein there is in each case rectification and smoothing at the output.

As shown already in FIGS. 1 and 2, a second module 2 having a further converter stage (further submodule C as constant-current source) can be connected to the storage capacitor 23, wherein the second module 2 (lamp management module) can have a control unit E, e.g. as integrated circuit. The further submodule C can be designed both as clocked constant-current source (that is to say, for example, as buck converter) or as linear controller (implemented with transistors or integrated circuits). However, LEDs can also be connected directly to the output of the second submodule B.

As shown in FIG. 1, external dimming commands can be supplied to the control unit G of the first module 1 but also to control unit E of the second module 2. In the second case, the control unit E of the second module 2 can transfer the dimming information to the control unit G of the first module 1 so that no measurement signal needs to be present for the power consumption but, instead, can be used from dimming information available to the control unit G for the DC/DC converter in the second module B.

However, the second submodule B can also be adjusted adaptively on the basis of an externally supplied dimming command or also on the basis of a return message by the second module 2.

The switches S1, S2 of the inverter 14 can be driven via the control unit G via a driver stage. Preferably, at least the driver stage for the switches of the inverter which are at high potential is designed for driving at high voltage potential. For example, this driver stage is a level-offset stage, a driver stage with transformer or a driver stage with air-core coil. This driver stage can also be integrated in the control unit G.

The control unit G can also have means for avoiding errors in the operation of the inverter. Thus, for example, overcurrent trips or current limiters for the current through at least one switch can be provided. The dead time for driving the inverter can also be adjustable (i.e. the period between opening of one switch (e.g. S1) and closing the second switch (S2)). This dead time is also preferably adaptively adjustable, for example in dependence on the center voltage at the inverter 14 or on the current or the voltage across a switch of the inverter 14.

The control unit G can also monitor the bus voltage $V_{Bus}$, especially also the ripple of the bus voltage $V_{Bus}$ (i.e. the fluctuations within a certain time). Depending on the evaluation of the ripple of the bus voltage $V_{Bus}$ the control unit G can influence the drive of the inverter 14. In particular, it can adapt the frequency of the inverter 14 to the evaluation of the ripple of the bus voltage $V_{Bus}$ in order to reduce the ripple at the output of the inverter 14. In this context, the frequency of the inverter is preferably increased with rising bus voltage $V_{Bus}$ and lowered with dropping bus voltage $V_{Bus}$. In this manner, it is possible to achieve that this ripple on the bus voltage $V_{Bus}$ is forwarded less strongly to the output of the inverter 14.

Figure 4:
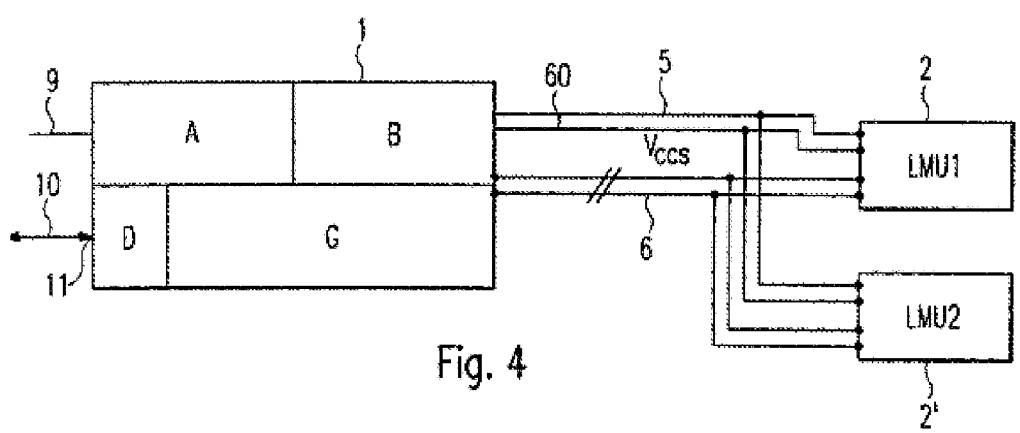
FIG. 4 shows the communication according to the invention between a master unit and a number of slave units of the modular LED lighting system.

Data Communication Between the First Module 1 and the Second Module 2 (Lamp Management Module):

Referring to FIG. 4, the communication interface 6 (internal bus) between the first module 1 and one or more second modules 2, 2' as lamp management modules shall be explained here.

Due to the fact that via the internal bus, several second modules 2, 2' are in communication not only with power (transmission path 5) but also unidirectional or bidirectional ones with data exchange (communication interface 6), the first module 1 can also be called central processing unit or also master. The second modules 2, 2' can be called slaves.

As already mentioned initially, there is a preferably standardized communication with regard to the internal bus for the communication interface 6, which is provided additionally to the DC supply voltage 5. "Standardized" is understood to mean that the protocol of the communication interface 6 is independent of the protocol of the external communication via the data interface 11 of the first module 1.

The communication via the communication interface 6 is preferably bidirectional and can take place, for example, in accordance with an SPI (Serial Peripheral Interface) protocol.

The data communication via the communication interface 6 (internal bus) also takes place preferably in potential-isolated manner, for example by using optocouplers or transformers. For example, when using one or more transformers for a potential-isolated communication interface 6, the transformer can be clocked at high frequency and thus transfer data via packets of high-frequency clock cycles. By using a potential-isolated communication interface 6, the user and also the connected other modules can be protected against possible overvoltages, for example due to a defect in one of the modules. As well, the potential-isolated design of the communication interface 6 increases the ruggedness of the lighting system. For example, the disconnection and exchange of a second module 2 is facilitated.

One basic function of the communication interface 6 can be the forwarding of dimming commands from the first module 1 to the second modules 2 which, for example, have been received via the external bus 10. In this process, new control information or commands for the second modules 2 can also be derived from the dimming commands received via the external bus 10.

One application for the bidirectional data communication via the internal bus (communication interface 6) is that data which are stored in one of the second modules 2, 2' can be transmitted via the internal bus (communication interface 6) to the control unit G of the first module 1. This is of advantage in as much as the data storage in the second modules 2, 2' is closer to the LED path 8 so that greater heating takes place there which can lead to a possibly not restorable data loss of the storage in the area of the lamp management modules (second modules 2, 2'). By the transmission via the communication interface 6 to the first module 1, these data can then be stored again for the first module 1 in the sense of a backup.

Examples of these data transmitted via the communication interface 6 are operating data for the LED path 8 such as, for example, temperatures, operating periods, electrical parameters etc.

Once the data have been transmitted from one of the lamp management modules (second modules 2', . . . , 2$^{n'}$) to the first module 1, they can naturally be read out, if necessary processed further, also via the external bus 10 connected to the data interface 11. Thus, a further analysis of the operating data, for example a failure analysis, ageing compensation depending on the transmitted operating period of the LED path 8 etc. can be carried out via the external bus 10.

The standardized approach for the internal bus (communication interface 6) also has the advantage that lamp management modules (second modules 2, 2') can be exchanged in simple manner. The supply of data stored in a lamp management module (second modules 2, 2') to be exchanged can be stored in the first module 1 after transmission via the communication interface 6 as already described above. If then the lamp management module is exchanged, the operating data stored in the first module 1 can be transferred again to the newly inserted lamp management module so that the latter is then configured identically to the replaced lamp management module.

Other examples of such operating data are color coordinates, color location or other parameters influencing the spectrum of the LED path 8.

It is also possible to transfer via the communication interface 6 load changes or special operating states or comparable events from a second module 2, 2' via the communication interface 6 to the first module 1. This makes it possible to provide advance signaling of load changes or operating state changes to be expected so that the control unit G in the first module 1 adaptively matches the drive of the PFC in the first submodule A and/or the drive of the second submodule B correspondingly. For example, the control unit G of the first module 1 can adapt parameters for the inverter 14 shown in FIG. 2 and/or controller characteristics for driving the PFC in the first submodule A in dependence on a load change or operating state change to be expected, transmitted via the communication interface 6 from a second module 2, 2'.

Naturally, a type of advance information can also take place in reverse, i.e. from the first module 1 towards the second modules 2, 2'. If, for example, the first module 1 receives via the external bus 10 and the data interface 11 or the interface circuit D, respectively, dimming commands which signify a load change of the LED path 8, such information, or a signal reproducing the operating state change, can be transferred via the bus or the communication interface 6 to the second modules 2, 2' so that the control unit E provided in the second modules 2, 2' can also adapt control parameters, for example for the constant-current source (further submodule C) in accordance with the load change to be expected.

The master/slave system shown in FIG. 4 also has advantages with respect to the reduction of electrical losses since a type of standby operation can be provided in which one, several or also all of the second modules 2, 2' connected to a first module 1 are turned off whilst at least the control unit G of the first module 1 can continue to monitor the externally connected bus 10 via the data interface 11 or the interface circuit D, respectively.

Externally, the master/slave system represented in FIG. 4 can be addressed preferably only via the bus 10 connected at the data interface 11 or the interface circuit D of the first module 1. Instead, there can be an internal hierarchical division, possibly including addressing via the internal bus (communication interface 6) towards the several connectable second modules 2, 2'.

Thus, there can be, on the one hand, an addressed communication towards the second modules 2, 2'. As an alternative or additionally, a broadcast mode can also be provided instead, i.e. a non-addressed data transmission from the first module 1 to all connected second modules 2, 2'. In this broadcast mode, a command sent out by the first module 1 via the internal bus (communication interface 6) is received by all second modules 2, 2' and evaluated.

In the case of emergency lighting, it can be provided that, as soon as emergency lighting detection has taken place by the first module 1, a corresponding control command is transmitted via the communication interface 6 and the second modules 2, 2' correspondingly adapt their operation. For example, to achieve lower basic brightness and thus a lower energy consumption for the emergency lighting operation, only one or a subgroup of the several second modules 2 supplied by the first module 1 can be operated.

The communication interface 6 can also be used for transmitting the low-voltage supply (there is then both data communication and energy transmission, for example via the DC low-voltage supply $V_{CCS}$ on the secondary side). For example, a so-called active low data transmission can be used wherein a level of some volts, for example 12V, is present in the idle state. In the case of coupling, for example, via transformers, energy could therefore still be transmitted even with an electrical isolation of the communication interface 6.

Low-Voltage Supply

Figure 5:
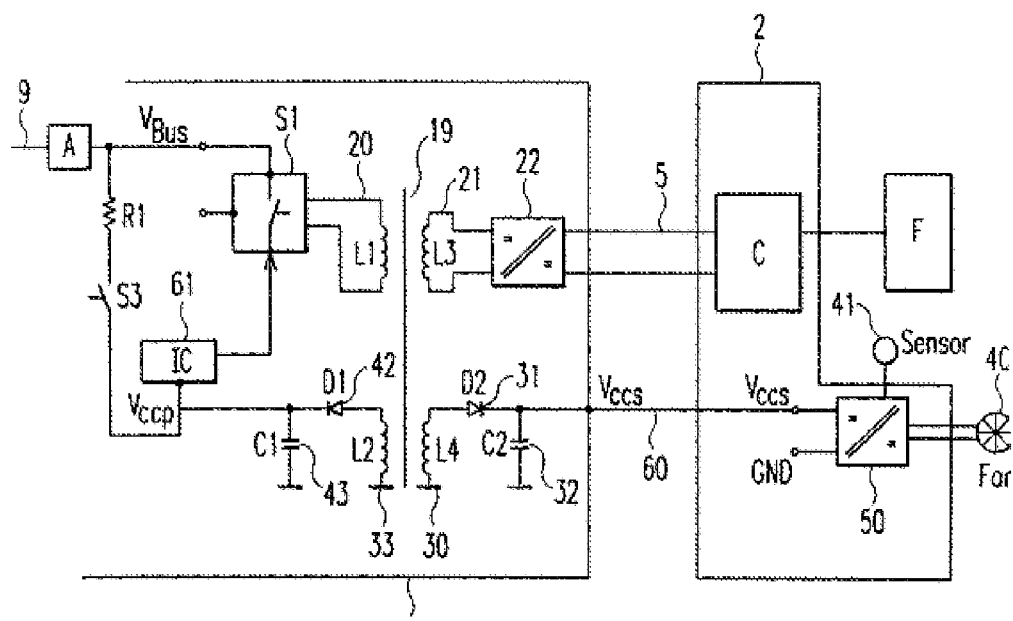
FIG. 5 shows the generation according to the invention of a low-level DC voltage.

Referring to FIG. 5, a low-voltage supply in the modular system shown in FIG. 1 will now be explained.

It will then also be explained how active cooling means 40 such as, for example, a fan, a pump, a Peltier element etc. can be supplied by such a low-voltage supply, for example also by a second module 2 (lamp management module). Such an active cooling means 40 is thus supplied with electrical power not directly starting from the first module 1, but preferably individually via each lamp management module 2 connected.

FIG. 5 again shows how the bus voltage $V_{Bus}$, for example generated by the PFC module of the first module 1, is supplied to an inverter. In the example shown, the inverter has only one switch S1 in contrast to the inverter 14 as half-bridge inverter of FIG. 2. In the example shown, following the inverter with the switch S1, the primary winding 20 of the transformer 19 is shown. A rectifier 22 is again supplied starting from the secondary winding 21 of transformer 19, in which the output voltage of the rectifier 22 is supplied directly or indirectly to the LED path 8. The primary and secondary windings 20, 21 thus represent the path, already explained further above, for the electrical power supply (DC supply voltage 5) of the LED path of the LED module F.

The inverter according to FIG. 5 can be a converter having one or more switches such as, for example, a half-bridge inverter (see example FIG. 2) or insulated flyback converter. This operates preferably in resonant or quasi-resonant manner.

In addition to this transmission path, there is now, according to the invention, a further low-voltage transmission path. This has a further secondary winding 30 which is thus also coupled magnetically to the primary winding 20. A DC low-voltage supply $V_{CCS}$ on the secondary side is generated by a corresponding choice of winding ratios of windings 20, 30 via a rectifier circuit comprising a diode 31 and a capacitor 32. Also shown in the figure, this DC low-voltage supply $V_{CCS}$ on the secondary side is also supplied to the second module 2. The second module 2 can then use this low-voltage supply in different ways, namely:

for supplying the integrated control unit E in the lamp management module (second module 2), for the selectively controlled driving of active cooling means 40 and/or for actively supplying further connected actuators or sensors which are designated diagrammatically by the reference symbol 41.

As also shown in FIG. 5, a further (and thus third) secondary winding 33 is coupled magnetically to the primary winding 20 of transformer 19. This secondary winding 33 feeds a rectifier comprising a diode 42 and a capacitor 43, is used for generating a low-voltage supply $V_{CCP}$ on the primary side. In this context, primary side is understood to mean that this low-voltage supply $V_{CCP}$ is used in the first module 1 (that is to say on the power line side, i.e. before potential isolation), for example as low-voltage supply for the internal integrated control unit G of the first module 1.

Whereas the power transfer via the path of the DC supply voltage 5 for feeding the LED module F can be, for example, 48 volts DC, the voltage level of the low-voltage supplies $V_{CCS}$ and $V_{CCP}$ is distinctly lower and, for example, within a range of from 2 to 12 volts DC.

Thus, two different DC voltage supplies can be supplied by the first module 1 to each second module 2 connected.

The lighting system can also be operated in such a manner that the second submodule B deactivates the feeding of the DC supply voltage 5 and only maintains the low-voltage supply (for example the DC low-voltage supply $V_{CCS}$ on the secondary side). This can take place, for example, in an error mode or idle mode. In this manner, for example, existing sensors such as the sensor 41 can still be evaluated and, for example, the communication interface 6 can also remain activated. For this purpose, the control unit E preferably continues to be operated at least in a reduced operating mode (for example with reduced functionality).

The sensor 41, which is functionally associated with the second module 2, can be a brightness sensor, for example a photodiode with optional evaluating logic, or a color sensor.

Naturally, the sensor 41 which is functionally associated with the second module 2 can also be a temperature sensor, the output signal of which can be used, for example, for determining the temperature of the LED junction of the LEDs of the LED module F. On the other hand, this sensor 41, as temperature sensor, can also be used for controlling the operation of the active cooling, for example of the cooling means 40 (preferably as fan).

As an alternative or additionally, the temperature of the LED junction can naturally also be determined by evaluating the characteristic and measurement of electrical parameters of the LED path of the LED module F.

Due to the fact that the low-voltage supply $V_{CCP}$ on the primary side takes place via a winding 33 independent for generating the low-voltage supply $V_{CCS}$ on the secondary side, a potential isolation is thus present.

As can be seen from a synopsis of FIG. 2 and FIG. 5, an inverter having one switch S1 or a number of switches S1, S2 can be present. As further examples next to the inverter 14 shown in FIG. 2 as half-bridge inverter, the flyback converter, a SEPIC or forwards converter can be mentioned. In any case, there is thus an insulated converter.

For the start-up phase of the control unit G of the first module 1, a start-up resistor R1 can be fed with the input voltage 9 in a manner known per se, which resistor supplies the control unit G with energy until the low-voltage supply $V_{CCP}$ on the primary side is generated as expected since the generation of the low-voltage supplies $V_{CCP}$ and $V_{CCS}$ on the primary side and also the secondary side assume clocking of the second submodule B (DC/DC converter). When the actual low-voltage supply has then started on the basis of the insulated converter (second submodule B), the ohmic start-up resistor R1 can be turned off again by means of switch S3 in order to thus avoid electrical losses via the start-up resistor R1 in the regular operation of the circuit.

The low-voltage supplies $V_{CCS}$, $V_{CCP}$ are preferably obtained by means of a full-bridge rectifier. However, it is also possible to use only a single diode for rectification.

The low-voltage supply $V_{CCS}$ can be supplied to a control unit E in the second module 2 and/or looped further for supplying an active cooling means 40 associated with the second module 2.

For voltage stabilization, the secondary DC low-voltage supply $V_{CCS}$ for the second module 2 can be supplied again, as shown in FIG. 5, to a cooling means drive 50, for example a DC/DC converter or also a linear controller, the stabilized output voltage of this DC/DC converter or linear controller 50 then feeding the control unit E of the second module 2.

The cooling means drive 50 can control or also regulate the drive of the active cooling means 40 in dependence on a dimming command supplied via the communication interface 6 (dimming information), on an input by the control unit E or also in dependence on the temperature at the LED module F, determined directly (via a temperature sensor) or indirectly (for example a temperature determination of the temperature of the LED junction).

Thus, active cooling means 40 can be supplied preferably by such a low-voltage supply via a cooling means drive 50 which is in each case arranged on the second module 2. In this case, such active cooling means 40 are thus not supplied with electrical power directly from the first module 1 but preferably individually via each lamp management module 2 connected. This offers the advantage that in the case of an operation of a number of second modules 2, 2' . . . via a first module 1, an independent drive of the active cooling means 40 is possible for each second module. This may be advantageous, in particular, when the brightness of the individual LED modules F is different or also the LED modules F are heated up by different amounts due to the spatial arrangement of the individual LED modules F.

As already mentioned, the low-voltage supply can also be used as communication interface 6, i.e. it is also possible to transmit data in addition to the transmitted energy.

Storage Calibration Communication Between Lamp Management Module and LED Module

As shown in FIG. 1, the LED module F can be provided in an associated memory 4, for example with an EPROM, FLASH or OTP.

Shown diagrammatically by the reference symbol 3 in FIG. 1, the control unit E, for example an integrated circuit or a microcontroller of the second module 2, can access the memory 4 of the LED module F in order to thus, for example, read out its memory content selectively. The data read out of this memory 4 can then also be sent, for example, from the control unit E of the second module 2 via the communication interface 6 (internal bus) to the first module 1. The data in the memory 4 can be, for example, the run time, production dates, error logging, maximum value, minimum values (e.g. for current and voltage) and/or the temperature.

This has the advantage that any impairment of the memory content of memory 4 of the LED module F, for example due to temperature impairment due to the great physical vicinity of the LED path 8, is reduced. Thus, the control unit E of the second module 2 can read out these data and store them in an associated memory in the sense of a backup. In addition, the control unit E of the second module 2 can refresh the memory 4 of the LED module F periodically or in dependence on operating state or events.

Instead, it may also be possible that the LED module F itself does not have a memory. The corresponding data, for example the permissible forward current for the LEDs of the LED path 8 can be written in this case into the memory 51 associated with the control unit E of the second module 2. This can be done, for example, during the production of the second module 2.

A further alternative or additional option is that the LED module F is provided with an identification tag which, for example, represents the operating data or represents at least an identification for the LED module F. The identification tag is then read out by the control unit E of the second module 2 and deposited, for example, in a memory associated with the control unit E of the second module 2. This data content, thus read out only once, of the identification tag can then be used for the further operation of the LED module F.

As mentioned, the identification tag may also be only a pure identification. The lamp management module (second module 2) would determine the identification data in this case and then determine from the memory independent from the LED module F, for example also a database content accessible via the external bus 10, associated operating data. Naturally, this approach has the advantage that the costs for the additional memory 4, for example an EPROM of the LED module F, can thus be saved.

The possibility of reading out the memory 4 of the LED module F by means of the control unit E results in the advantage that quite different LED modules F can be combined with a lamp management module (second module 2), wherein the required operating data can then be read out of the LED module F and the lamp management module (second module 2) can thus flexibly adapt itself to the connected LED module F.

Light Power Calibration

As shown diagrammatically already in FIGS. 6a, 6b, the LED module F preferably has two, three or even more channels 53, 53', 53", which are controllable independently of one another. Each channel 53, 53', 53" can have one LED path 8, 8', 8" comprising one or more LEDs. Naturally, the LEDs of an LED path 8, 8', 8" are preferably almost identical with regard to their spectrum.

The aim is that the different LED channels 53, 53', 53" of the LED module F span in the color space a space within which the desired drivable color coordinates are located.

In this context, an embodiment of the two or more LED channels 53, 53', 53" of the LED module F is preferably of such a type that the space spanned comprises at least large areas of the Planckian white-light curve.

An exemplary embodiment could thus be:
a first channel with one or more monochromatic blue LEDs,
a second channel with one or more monochromatic red LEDs, and
a third channel with one or more dye-converted LEDs, preferably within the greenish-white spectrum.

When three different LED channels are present, a triangle is thus spanned in the color coordinate system (CIE). By means of different individual driving of the intensities of the different LED channels, each chromaticity coordinate within the resultant triangle formed can be driven.

The above example spans in the color space a triangle which covers at least large areas of the Planckian white-light curve. Thus, any point on the Planckian white-light curve can be driven essentially by individually driving the three set LED channels, i.e. it is possible to emit white light having different color temperature as result of a mixture of the light of the several LED channels.

As mentioned, in order to energize the different chromaticity coordinates, especially on the Planckian white-light curve, the different LED channels must be energized with different intensity (current).

With a known determined or previously known efficiency of the LEDs of the LED channels, this is mathematically possible, i.e. on the basis of an X/Y coordinate of the desired chromaticity coordinate, the intensity to be energized in the individual channels can be calculated directly.

It is then one problem that different LEDs have different efficiencies (lumen/LED current). In particular, the curve of the light output (brightness for a predetermined wavelength) or its slope, respectively, is not the same for all LEDs. If then different chromaticity coordinates are energized within the triangle spanned in the color coordinate system, especially for following the Planckian white-light curve, the desired spectrum will be achieved, but the total light output will normally change. The total light output will then tend to become less, the greater the proportion of intensity of less efficient LEDs.

According to one aspect of the invention, the total light output is now intended to remain constant even when sweeping different chromaticity coordinates, in particular on the Planckian white-light curve.

For this purpose, it is first determined mathematically or experimentally at which point within the chromaticity coordinates to be traced within the color triangle spanned the minimum light output is present. Knowing the minimum light output, the driving intensities for all other chromaticity coordinates to be traced can then be calibrated, i.e. the intensities for each chromaticity coordinate deviating from the minimum light output are 'artificially' scaled down so that lastly constant light is generated everywhere with the minimum achievable light output in the color space spanned.

This calibration for the minimum achievable light output is thus carried out by means of a calibration factor which is applied identically to the intensities of all LED channels.

In this context, the calibration factor can be calculated on the basis of the known efficiencies of the LEDs used.

In the case where the efficiencies of the different LEDs of LED paths 8, 8', 8" should not be known, the total light output can be measured for example by means of a photosensor during the tracing of different chromaticity coordinates, especially in the manner of a scan of the Planckian white-light curve whilst simultaneously measuring the total light output. Such a measurement thus determines, on the one hand, the minimum total light output within the chromaticity coordinates to be traced and the dependence of the total light output on the chromaticity coordinate.

For example, the calibration factor for reducing the intensities of the individual LED paths can be obtained in the sense of PWM dimming (by changing the pulse width of the drive). Thus, the calibrating is preferably generated by reducing the duty ratio of a PWM drive. However, this can also be done by adapting the amplitude (in the sense of amplitude dimming). It is especially when the dimming or adjusting of the intensity is carried out via a pulse width modulation (PWM) that the calibration can be carried out by adapting the amplitude.

The intensity scan mentioned can be carried out repeatedly because the different LEDs have different ageing phenomena with regard to their efficiency (intensity per current), which must be compensated for and can lead to different efficiencies. Especially a dye-converted LED will have a higher degree of ageing than monochromatic LEDs.

However, the intensity scan mentioned can also be used for monitoring the ageing if the operating data of the LED are known (for example stored in memory 4 of the LED module F).

Instead, such ageing parameters may also have been determined already by the manufacturer and deposited, for example, in memory 4 which is associated with the LED module F.

LIST OF REFERENCE DESIGNATIONS

1: First module
2, 2': Second module
3: Access of E to 4
4: Memory
5: DC supply voltage
6: Communication interface
7: Output
8, 8', 8": LED path
9: Input voltage
10: External bus
11: Data interface
12: Housing
13: Feedback value of 8
14: Inverter
15: Resonant circuit
16: Inductance
17: Coupling capacitor
18: Inductance
19: Transformer
20: Primary winding
21: Secondary winding
22: Rectifier
23: Storage capacitor
24: Measuring resistor
29: Center
30: Secondary winding
31: Diode
32: Capacitor
33: Secondary winding
40: Cooling means
41: Actuators or sensors
42: Diode
43: Capacitor
50: Cooling means drive
51: Memory
52: Memory which is connected to control unit G
53, 53', 53": LED channel
A: First submodule
B: Second submodule
C: Further submodule
D: Interface circuit
E: Control unit
F: LED module
G: Control unit
Lm: Main inductance
R1: Start-up resistor
S1: Switch
S2: Switch
S3: Switch
$V_{Bus}$: Bus voltage
$V_{CCP}$: Low-voltage supply on the primary side
$V_{CCS}$: DC low-voltage supply on the secondary side

The invention claimed is:

1. A modular LED lighting having a first module (1), to which an AC input voltage (9) can be supplied and which has a first submodule (A), a second submodule (B), and a control unit (G), wherein:
the first submodule (A) is configured to convert the AC input voltage (9) to a DC voltage to be supplied to the second submodule (B);
the second submodule (B) is an insulated energy-transferring DC/DC converter and comprises an inverter (14), a resonant circuit (15), a transformer (19), which isolates an DC output voltage (5) electrically from the AC input supply voltage (9), and a rectifier (22); and
several second modules (2), each second module (2) of the several second modules (2) having a further submodule (C) and a control unit (E), wherein the further submodule (C) of the second module (2) is supplied with the DC output voltage (5) of the first module (1), and is a clocked constant-current source which is controlled by the control unit (E) of the second module (2) and wherein the several second modules (2) are selectively selectable for switching off the selected second modules (2); and
an LED module (F) which has at least one LED path (8) and which is supplied by the further submodule (C).

2. The LED lighting as claimed in claim 1, wherein the control unit (G) of the first module (1) and the control unit (E) of the second module (2) are in data communication via a communication interface (6).

3. The LED lighting as claimed in claim 2, wherein the internal data communication between the first module (1) and the second module (2) is standardized, which is independent of an external bus communication of the first module (1).

4. The LED lighting as claimed in claim 1, wherein the first module (1), apart from the DC supply voltage (5) for the further submodule (C), also provides a DC low-voltage supply ($V_{CCS}$) for the second module (2).

5. The LED lighting as claimed in claim 1, wherein the second module (2) and the LED module (F) are accommodated in a common housing (12).

6. The LED lighting as claimed in claim 5, wherein an active and/or passive cooling means (40) is connected to the common housing (12).

7. The LED lighting as claimed in claim 1, wherein the control unit (G) of the first module (1) can be addressed by an interface circuit (D) via an external bus (10).

8. The LED lighting as claimed in claim 7, wherein the control unit (G) of the first module (1) can be addressed by an interface circuit (D) via an external bus (10) with potential isolation.

9. The LED lighting as claimed in claim 1, wherein the first module (1) supplies one or more connected second modules (2) in parallel with at least two DC voltages having a different level.

10. The LED lighting as claimed in claim 1, wherein the second module (2) comprises a lamp management module.

11. The LED lighting as claimed in claim 1, wherein the first submodule (A) is a rectifier submodule (A), which converts the AC input voltage (9) to a DC bus voltage to be supplied to second submodule (B).

12. The LED lighting as claimed in claim 11, wherein the inverter (14) converts the DC bus voltage to a second AC voltage to be supplied to the resonant circuit (15) and the transformer (19).

13. The LED lighting as claimed in claim 12, wherein the rectifier (22) is configured to convert a third AC voltage from the transformer (19) to the DC output voltage (5).

14. The LED lighting as claimed in claim 1, wherein the resonant circuit (15) is a series inductance-capacitance circuit.

* * * * *